United States Patent [19]

Lewinger et al.

[11] 4,272,824

[45] Jun. 9, 1981

[54] BATCH PRODUCT PREPARATION

[75] Inventors: Nathan Lewinger, Rochester; John A. Gillis, Webster, both of N.Y.

[73] Assignee: Pennant Products, Inc., Rochester, N.Y.

[21] Appl. No.: 67,415

[22] Filed: Aug. 17, 1979

[51] Int. Cl.³ .......................................... G05D 11/02
[52] U.S. Cl. ...................... 364/502; 141/83; 177/50; 177/70; 222/56; 222/77; 364/468; 366/141; 366/152; 366/162
[58] Field of Search .................. 222/55, 56, 57, 76, 222/77; 174/83, 196; 364/468, 469, 478, 479, 502, 552, 555, 571, 567, 568; 366/18, 131, 132, 141, 142, 152, 162, 189, 348; 177/1, 62, 69, 66, 122, 123, 50, 70

[56] References Cited

U.S. PATENT DOCUMENTS

| | | | |
|---|---|---|---|
| 2,716,534 | 8/1955 | Howard | 366/141 X |
| 3,116,801 | 1/1964 | Bauder et al. | 364/571 X |
| 3,203,591 | 8/1965 | Daulton et al. | 222/76 X |
| 3,274,377 | 9/1966 | Morison | 364/468 X |
| 3,362,490 | 1/1968 | Maxwell | 177/70 |
| 3,476,198 | 11/1969 | Francis | 177/50 |
| 3,515,860 | 6/1970 | Fitzgerald, Jr. | 364/469 X |
| 3,592,328 | 7/1971 | Griem, Jr. | 177/1 |
| 3,959,636 | 5/1976 | Johnson et al. | 364/502 X |
| 4,164,260 | 8/1979 | Blodgett | 177/1 |

FOREIGN PATENT DOCUMENTS

| | | | |
|---|---|---|---|
| 1112318 | 5/1968 | United Kingdom | 364/502 |
| 197216 | 5/1967 | U.S.S.R. | 177/50 |

*Primary Examiner*—Robert J. Spar
*Assistant Examiner*—Edward M. Wacyra
*Attorney, Agent, or Firm*—Lawrence P. Kessler

[57] ABSTRACT

Control for a multiple batch process for preparing product from a plurality of constituent ingredients, in which an error in one batch from the multiple batch is equally divided over the subsequent batches so that all of the remaining portion of the multiple batch can be used and the resulting product is uniform. In the process of preparing product from a plurality of constituent ingredients, a batch of certain of such ingredients is mixed in a receptacle, sequentially divided into substantially equal portions and transported to an apparatus for combination with certain other of such ingredients for preparing the product. The error compensating control comprises an intermediate chamber in flow communication with the receptacle and the apparatus. A predetermined portion of the mixed batch is transferred from the receptacle to the intermediate chamber, where it is weighed, and then delivered to the apparatus. The weight of the delivered portion of the mixed batch is compared with a predetermined desired portion of the mixed batch to determine any error between the delivered portion and the predetermined desired portion. If there is an error, the error is divided by the remaining number of substantially equal portions of the mixed batch to establish a new predetermined portion of the mixed batch. The transfer of subsequent predetermined portions of the mixed batch is then adjusted to the newly established predetermined portion.

6 Claims, 2 Drawing Figures

BATCH PRODUCT PREPARATION

BACKGROUND OF THE INVENTION

This invention relates generally to a process for preparing a product from a plurality of ingredients by combining the ingredients to form a multiple weight batch thereof, and then taking individual weight batches from the multiple batch; more particularly, the invention relates to a control for accurately determining the weight of the combination of ingredients in an individual batch taken from the multiple batch and correcting the weight of subsequent batches for any weight error in an individual batch.

In the formation of certain products such as soaps, food mixes, or bakery products, selected quantities of different ingredients are combined and mixed (blended) together to form the product. In large scale industrial applications of preparation of such products, multiple weight batches are prepared at one time. Accordingly, the quantities of the different ingredients making up a product are significantly larger than one batch of the product, but are in the same proper relative proportions. The larger multiple weight batch of combined ingredients for a particular product is then divided into individual batches of the desired end-product size which are uniform in nature. The principal advantages to preparing the larger multiple weight batch of combined ingredients, is that the bulk weights of the individual ingredients that make up the product can be used as received and the blending of the ingredients can be more accurately controlled for uniformity of the product. For example, the measuring of any particular ingredient need only be done once; and the larger the quantity of product being measured, the more accurate the measurement can be made. However, any measuring error in the larger multiple batch of combined ingredients has an adverse effect on the overall economy of the process in that the last of the individual batches formed from the larger batch absorbs the entire error (last individual batch will be under or over size depending upon whether the measuring error was less or more than the desired quantity) and if the error is too large that batch must be thrown out.

Recently, multiple batch product preparation techniques have been developed using sophisticated controls, such as computers, to assist in measuring of individual ingredients and compensating for measuring errors. Typically, error compensation is accomplished by continuously monitoring the flow rate or weight of the individual constituent ingredients and accordingly adjusting the processing cycle. The adjustment can be made continuously for a flow rate monitored process or periodically for a weight monitored processes. In either instance adjustment is made in the batch being processed or the next subsequent processed batch. This tends to generate an immediate overcompensation in the next processed batch, or a progressive carry-over error which accumulates such that at least the last batch is again out of normal tolerance limits and is unusable.

SUMMARY OF THE INVENTION

It is the purpose of the invention to provide control for a multiple batch process for preparing product from a plurality of constituent ingredients, in which an error in one batch from the multiple batch is equally divided over the subsequent batches so that all of the remaining portion of the multiple batch can be used and the resulting product is uniform. In the process of preparing product from a plurality of constituent ingredients, a batch of certain of such ingredients is mixed in a receptacle, sequentially divided into substantially equal portions and transported to an apparatus for combination with certain other of such ingredients for preparing the product. The error compensating control comprises an intermediate chamber in flow communication with the receptacle and the apparatus. A predetermined portion of the mixed batch is transferred from the receptacle to the intermediate chamber, where it is weighed, and then delivered to the apparatus. The weight of the delivered portion of the mixed batch is compared with a predetermined desired portion of the mixed batch to determine any error between the delivered portion and the predetermined desired portion. If there is an error, the error is divided by the remaining number of substantially equal portions of the mixed batch to establish a new predetermined portion of the mixed batch. The transfer of subsequent predetermined portions of the mixed batch is then adjusted to the newly established predetermined portion.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
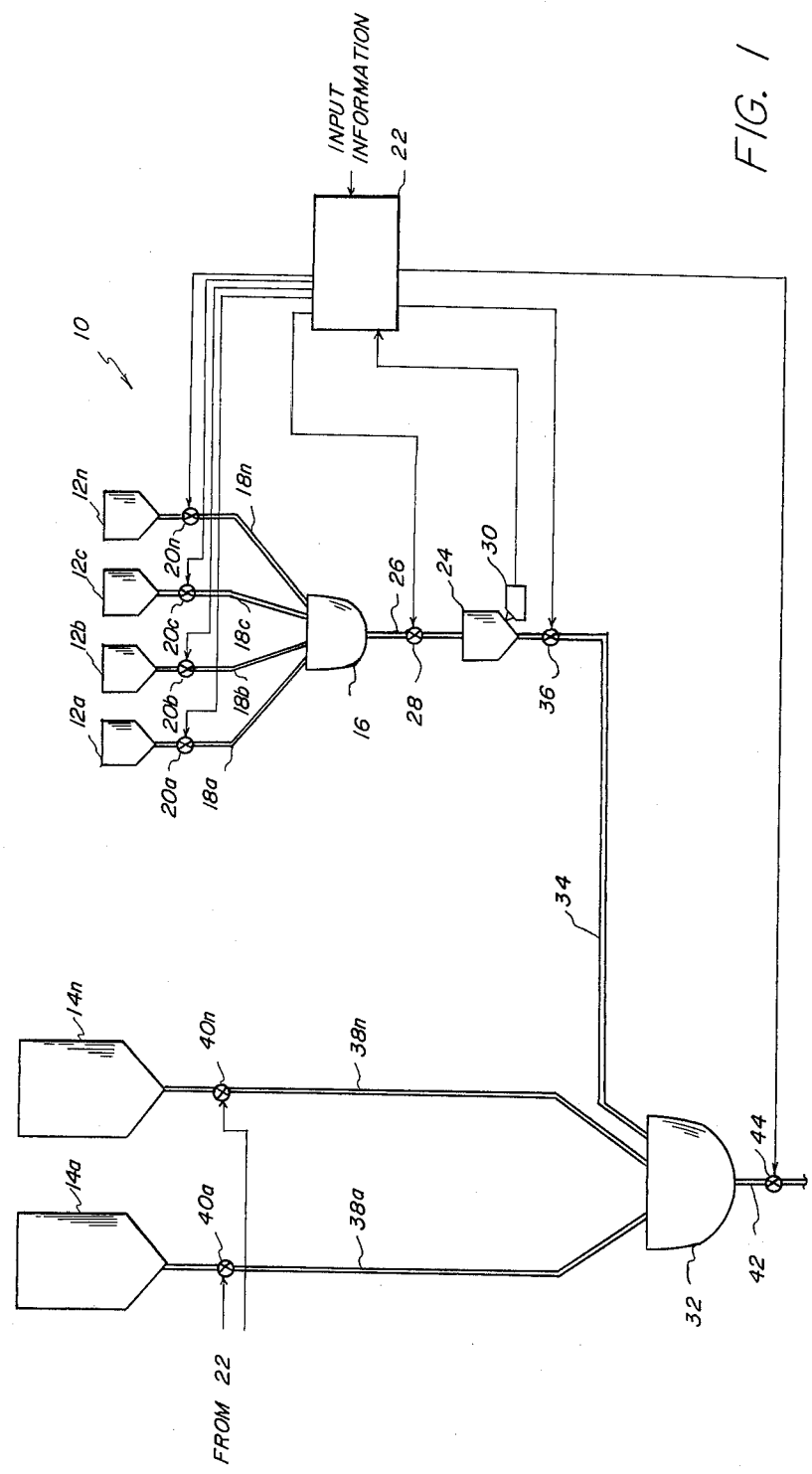
FIG. 1 is a schedmatic illustration of a bakery product production process including the error compensation control according to this invention.
Figure 2:
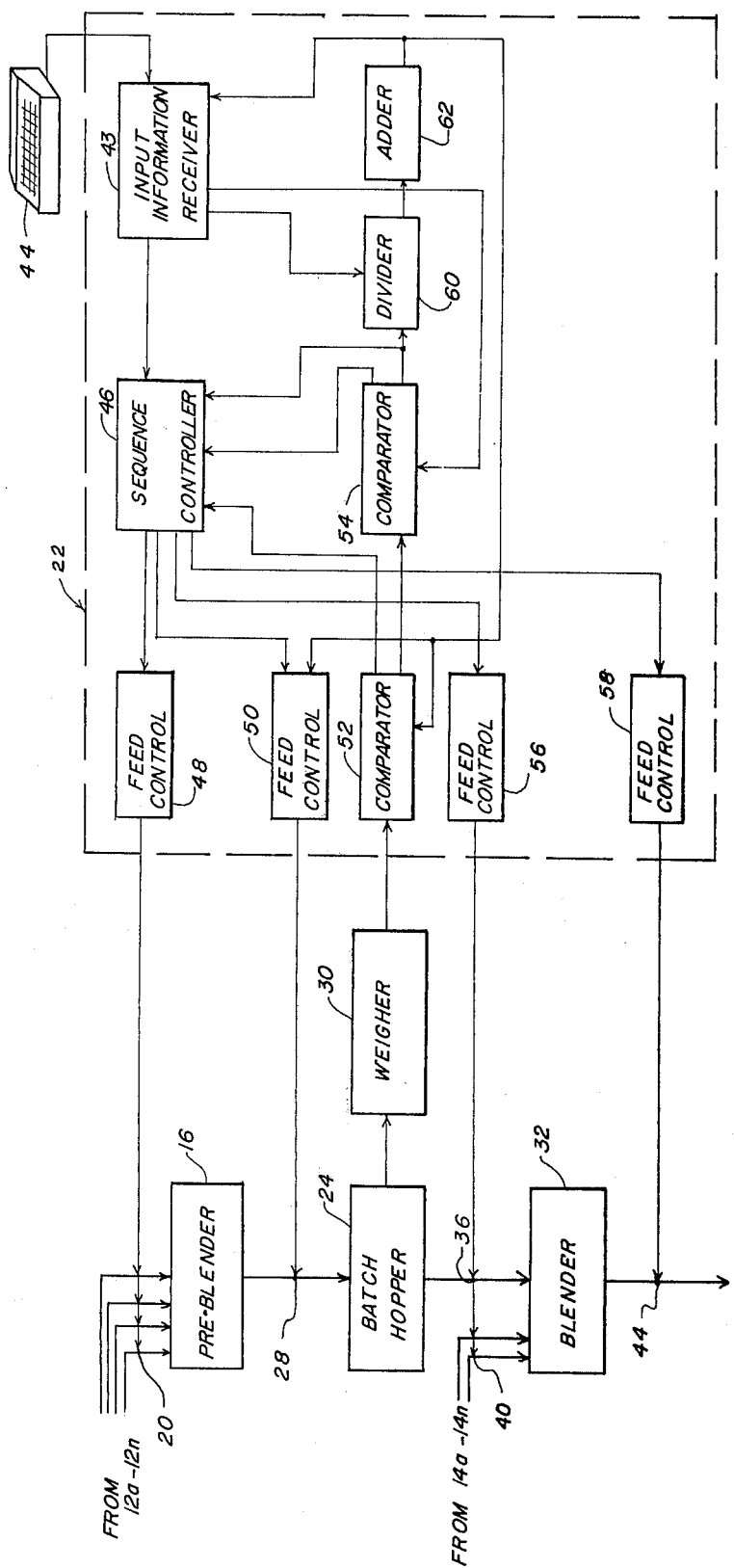
FIG. 2 is a more detailed illustration of the error compensation control of FIG. 1.

The error compensation control of this invention is used, as an illustrative example, in a process for preparing bakery product. Typically, a particular bakery product is specially formulated from a plurality of constituent ingredients in preselect amounts. The formulation includes several major constituents which make up, for example, 90% by weight of the product, and numerous minor constituents which make up the remainder. Major constituents can be flour, sugar, and salt; while minor constituents can be flavoring, coloring, and preservatives.

To take advantage of the economies of scale, the major constituents are received in bulk and divided into desired batch sizes for mixing with the minor ingredients. The minor ingredients may also be received in bulk. However, since the amount of any one minor ingredient is relatively quite small when compared to the major ingredients, all of the minor ingredients are usually preblended into a multiple ingredient storage batch to be subsequently, substantially equally divided for mixing with a batch of the major ingredients. As noted above, since the quantities of the multiple ingredient storage batch are greater than any single batch, the measuring function is less subject to error.

In the accompanying drawings, the mixing apparatus 10 of a process for preparing bakery product includes a first series of hoppers 12a–14n and a second series of hoppers 14a–14n. Each of the hoppers 12a–12n receives a loading in bulk of respective minor ingredients, while each of the larger hoppers 14a–14n receives a loading in bulk of respective major ingredients. The ingredients in the hoppers are, of course, dependent upon the particular product to be produced. The hoppers 12a-12n are in flow communication with a pre-blender 16 via respective conduits 18a-18n. Valves 20a-20n in respective conduits 18a-18n control the flow of the ingredients from the hoppers 12a-12n to the pre-blender 16. The opening and closing of the valves 20a-20n is regulated by a process control apparatus 22, such as a programmable control computer available from Taylor Instrument Company of Rochester, N.Y. An input information receiver 43 of the process control apparatus 22 is programmed, for example, from a keyboard 44 to produce a particular product according to a desired recipe. When the process control apparatus 22 is activated by the keyboard 44, a sequence controller 46 in the apparatus 22 produces a signal which is delivered to a feed control 48 to open the valves 20a-20n to dump the minor ingredients into the pre-blender 16. The pre-blender has internal mixing vanes (not shown) for adequeately blending the minor ingredients into a uniform mixture.

The pre-blender 16 is, in turn, in flow communication with a batch weighing hopper 24 via conduit 26. A valve 28, controlled by the control apparatus 22, regulates the flow of the mixed minor ingredients from the pre-blender 16 to the batch weighing hopper 24. When it is desired to produce an individual batch of the bakery product, the sequence controller 46 produces a signal in timed sequence, which is delivered to a feed controller 50 to open the valve 28 to dump a predetermined quantity of the mixed minor ingredients from the pre-blender 16 into the hopper 24. The feed controller 50 receives a signal produced by the input information receiver 43 so that the valve 28 remains open for a preselected length of time necessary to dump the predetermined quantity of the mixed minor ingredients. The predetermined quantity of mixed minor ingredients is dependent upon the recipe of the bakery product to be produced, and is typically a portion of the total quantity of mixed minor ingredients substantially equal to the total quantity of mixed minor ingredients divided by the number of batches to be produced from each total quantity.

However, the actual portion of mixed minor ingredients delivered to the hopper 24 may deviate from the desired predetermined quantity due to the flow characteristics of the ingredients in the conduit 26 (e.g. some portion of the flow may stick in the conduit). Therefore, the actual portion of mixed minor ingredients in the hopper 24 must be checked against the desired predetermined portion of such ingredients to insure the production of the bakery product results in acceptable uniform end product. Accordingly, the weight of the mixed minor ingredients delivered to the hopper 24 is checked by a batch weighing system 30, such as for example by a load cell available from Orbitron Company, Inc. of Lakeside, Calif. A signal produced of the batch weighing system 30, representative of the actual weight of the ingredients in the hopper 24 is delivered to a comparator 52 where it is compared to the predetermined desired weight of the ingredients in order to determine if there is any error between the delivered weight and the predetermined weight. If there is no error, a signal is produced which is delivered to the sequence controller 46 indicating that the remaining steps in the process can continue.

On the other hand, if an error is found to exist, a signal representative of the magnitude of the error is produced and delivered to a comparator 54. The comparator 54 determines whether or not the error lies within an acceptable tolerance range as indicated by a signal from the receiver 43 representative of the tolerance range. When the error is not within the tolerance range, there would be a substantial adverse effect on the bakery product to be produced; therefore, a signal is produced which is delivered to the sequence controller 46 to terminate the process and give an appropriate alarm. When the error is within the acceptable tolerance range, a signal is produced which is delivered to the sequence controller indicating that the process can continue.

Thereinafter, the batch of mixed minor ingredients in the hopper 24 is dumped into a blender 32 through a conduit 34. The flow is regulated by a valve 36 in the conduit 34, the opening of which is controlled by a signal from the sequence controller 46 to a feed controller 56. As the mixed minor ingredients are delivered to the blender 32, the feed controller 56 also controls the dumping of the major ingredients in hoppers 14a-14n to the blender 32 through conduits 38, the flow of the major ingredients being regulated by valves 40a-40n in the conduits 38a-38n. After all of the ingredients are delivered to the blender 32, they are mixed by internal mixing vanes (not shown) for adequate blending into a uniform mixture. After the blending is complete, the sequence controller 46 produces a signal which is delivered to feed controller 58. Feed controller 58 controls the opening of valve 44 so that the mixture can be dumped through a conduit 42 to the next processing station (e.g. packaging apparatus).

When the error calculated in the comparator 52 is determined to be within the process tolerance limits in comparator 54, the error must be prevented from accumulating through subsequent batches, or providing an immediate overcompensation in the next subsequent batch. Therefore a signal representative of the magnitude of the error is delivered to a divider 60. The divider 60 also receives a signal from the input information receiver 43 indicative of the number of individual batches remaining to be processed. The divider then divides the error by the number of batches remaining to be taken from the mixed minor ingredients in the pre-blender 16 and produces a signal representative thereof. Such signal is delivered to an adder 62 which, in turn produces a signal representative of a new desired predetermined quantity of the mixed minor ingredients. The signal from the adder 62 is delivered to the receiver 43, the comparator 52 and the feed controller 50. Thus on the next cycle, when the valve 28 is opened by the feed controller 50 to dump the next batch of minor mixed ingredients from the pre-blender 16 into the hopper 24, it is controlled to allow the new desired predetermined quantity of ingredients to pass into the hopper. In this manner, immediate overcompensation in the next batch is eliminated, or error accumulation is prevented. The error determination and compensation over remaining batches of the mixed minor ingredients is repeated in the above described manner for each new batch dumped from the pre-blender 16 so that the end product produced is substantially uniform.

We claim:

1. In a process for preparing product from a plurality of constituent ingredients wherein said process includes mixing a multiple batch of certain of such ingredients in a receptacle and sequentially dividing and transporting substantially equal portions of said mixed batch to an apparatus for combination with certain other of such ingredients for preparing said product, means for controlling the division of said mixed batch into said substantially equal portions, said control means comprising:
- an intermediate chamber in flow communication with said receptacle and said apparatus;
- means for substantially transferring a predetermined portion of said mixed batch from said receptacle to said intermediate chamber and thence to said apparatus;
- means for weighing said portion of said mixed batch delivered to said intermediate chamber;
- means for comparing the weight of said portion of said mixed batch delivered to said intermediate chamber with a predetermined desired portion of said mixed batch to determine any error between said delivered portion and said predetermined desired portion;
- means for dividing any such determined error by the remaining number of substantially equal portions of said mixed batch to establish a new desired predetermined portion of said mixed batch; and
- means operatively coupled to said transferring means for adjusting the predetermined portion of said mixed batch to be transferred from said receptacle to said new desired predetermined portion established by said dividing means.

2. The invention of claim 1 wherein said control means further comprises means for comparing said determined error with a reference tolerance error, and means for interrupting said process if said determined error exceeds said tolerance error.

3. The invention of claim 1 wherein said control means includes a programmable input information receiver means, containing information relative to the process for preparing said product, for producing a signal indicative of said predetermined desired portion of said mixed batch, and said weighing means includes means for producing a signal indicative of the weight of said portion of said mixed batch delivered to said intermediate chamber, and wherein said comparing means includes means for receiving said signal from said input information receiving means and said weighing means, and for producing an error signal of a magnitude equal to the difference between said received signals.

4. The invention of claim 3 wherein said input information receiver means produces a signal indicative of the remaining number of substantially equal portions of said mixed batch, and wherein said dividing means includes means for receiving said signal indicative of the remaining number of substantially equal portions of said mixed batch and said error signal, and for producing a signal of a magnitude equal to said error signal divided by said signal indicative of the remaining member of substantially equal portions of said mixed batch.

5. In a process for preparing product from a plurality of constituent ingredients wherein said process includes mixing a multiple batch of certain of such ingredients in a receptacle and sequentially dividing and transporting substantially equal portions of said mixed batch to an apparatus for combination with certain other of such ingredients for preparing said product, a method for controlling the division of said mixed batch into said substantially equal portions, said method comprising the steps of:
- transferring substantially a predetermined portion of said mixed batch from the receptacle to an intermediate chamber and thence to the apparatus;
- weighing the substantial portion of said mixed batch delivered to the intermediate chamber;
- comparing the weight of the substantial portion of said mixed batch delivered to the intermediate chamber with a predetermined desired portion of said mixed batch to determine any error between said delivered portion and said predetermined desired portion;
- dividing any such determined error by the remaining number of substantially equal portions of said mixed batch to establish a new desired predetermined portion of said mixed batch; and
- adjusting the predetermined portion of said mixed batch subsequently transferred from the receptacle to the new desired predetermined portion.

6. The invention of claim 5 further including the steps of:
- comparing the determined error with a reference tolerance error; and interrupting the process if the determined error exceeds the tolerance error.

* * * * *